United States Patent [19]
Corliss

[11] Patent Number: 5,989,082
[45] Date of Patent: Nov. 23, 1999

[54] PROPULSION SYSTEM FOR LARGE SHIPS

[76] Inventor: Joseph J. Corliss, 10119 Vanderbilt Cir., Rockville, Md. 20850-4673

[21] Appl. No.: 09/009,134

[22] Filed: Jan. 20, 1998

[51] Int. Cl.$^6$ .................................................. B63H 11/14
[52] U.S. Cl. ............................ 440/45; 114/67 A; 114/151
[58] Field of Search ................................ 440/38, 44, 45; 114/67 A, 151

[56] References Cited

U.S. PATENT DOCUMENTS

| | | | |
|---|---|---|---|
| 3,013,384 | 12/1961 | Smith, Jr. ..................................... | 440/44 |
| 3,402,555 | 9/1968 | Piper ............................................ | 440/44 |
| 3,481,296 | 12/1969 | Stephens ..................................... | 114/67 |
| 3,481,297 | 12/1969 | Mantle ........................................ | 114/67 |
| 3,827,388 | 8/1974 | Fulton ......................................... | 440/44 |
| 4,176,613 | 12/1979 | Rickards et al. ............................ | 114/67 |
| 4,543,901 | 10/1985 | Stringer ....................................... | 114/67 |
| 4,863,404 | 9/1989 | Salo ............................................. | 440/38 |
| 5,146,863 | 9/1992 | Ford ............................................ | 114/67 |
| 5,146,865 | 9/1992 | Lais et al. ................................... | 114/151 |
| 5,454,440 | 10/1995 | Peters ......................................... | 180/118 |
| 5,476,056 | 12/1995 | Tokunaga et al. ......................... | 114/67 A |

*Primary Examiner*—Jesus D. Sotelo
*Attorney, Agent, or Firm*—Norman B. Rainer

[57] ABSTRACT

A propulsion system for a large, nuclear-powered ship includes a number of steam expansion thrusters rearwardly directed from the stern portion of the ship above the water line, a number of water jet drivers rearwardly directed from the stern portion below the water line, and a number of water jet thrusters downwardly directed from the hull portion of the ship. The frictional drag effect on the ship may be reduced by providing a curtain of air bubbles adapted to flow rearwardly in contact with the hull portion.

8 Claims, 1 Drawing Sheet

PROPULSION SYSTEM FOR LARGE SHIPS

BACKGROUND OF THE INVENTION

1. Field of the Invention

This invention concerns marine vessels and more particularly relates to a propulsion system for large naval ships.

2. Description of the Prior Art

Aside from wind-propelled boats such as sailboats, the most universal means of ship propulsion is by way of propellers mounted at the rear of the vessel and powered by engines capable of producing rotary output power. The speed of propeller-driven vessels is dependent upon the hull design of the vessel, and the design and rotational speed of the propeller. In addition to considerations of ship velocity, an important factor in the design and engineering of ships is the efficiency with which fuel is converted into propulsion.

In large ships, having a length in excess of 750 feet, and a displacement in excess of 20,000 tons, the propulsion system must be reliable and sufficiently versatile to provide expected performance under diverse weather and sea conditions. Accordingly, it is imprudent to rely upon single propellers, single engines, or single coupling systems between engine and propeller. It is well known that conventional displacement travel of a boat through water is slower than a planing mode of travel wherein the boat is partially or totally upraised from the surface of the water. However, boats must usually be specially designed to achieve a planing or semi-planing mode of travel, and such mode of travel usually requires a greater speed than the conventional displacement mode of travel.

It is accordingly an object of the present invention to provide a multi-component propulsion system for large ships.

It is another object of this invention to provide a propulsion system as in the foregoing object which will enable a large ship to operate in either a conventional displacement mode of travel or in an upraised planing or semi-planing mode of travel.

It is a further object of the present invention to provide a propulsion system of the aforesaid nature which includes a low-friction hull capable of lifting the ship to achieve said planing or semi-planing mode of operation.

It is a still further object of the present invention to provide a propulsion system of the aforesaid nature having several different specific propulsion factors which may be utilized separately or in combination.

These objects and other objects and advantages of the invention will be apparent from the following description.

SUMMARY OF THE INVENTION

The above and other beneficial objects and advantages are accomplished in accordance with the present invention by a propulsion system for a large ship comprising:

a) a number of steam expansion thrusters rearwardly directed from the stern of the ship, b) a number of water jet drivers rearwardly directed from the stern of the sip, c) a number of water jet thrusters downwardly directed from the hull of the ship, d) air dispersing means for creating a curtain of air bubbles in close proximity to said hull, and e) a hull configuration which channels the passage of said air bubbles in a manner to reduce frictional drag effect upon said hull.

The propulsion system of this invention is preferably employed with nuclear powered naval ships, and is intended to greatly enhance the speed of said ships while providing versatility in the manner of propulsion for various tactical and weather conditions.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
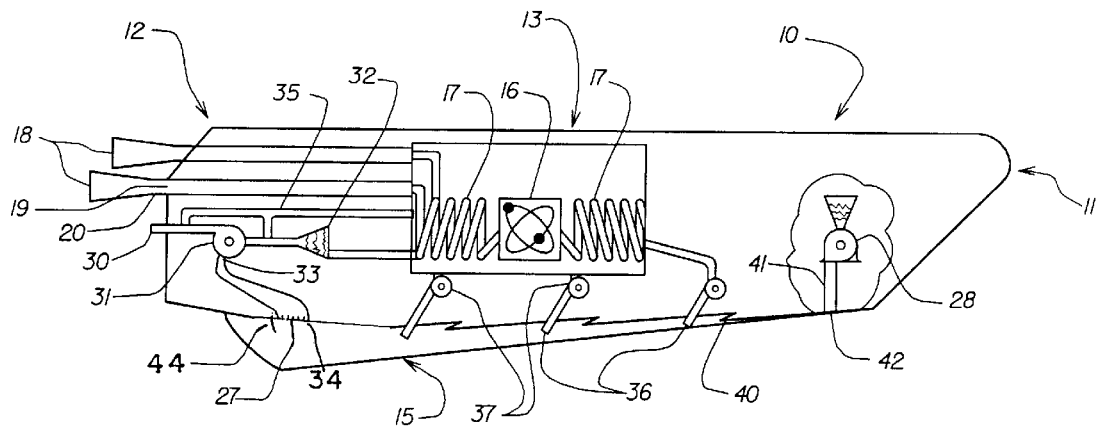
FIG. 1 is a schematic side view of an embodiment of the propulsion system of the present invention shown in association with a large nuclear-powered naval ship.
Figure 2:
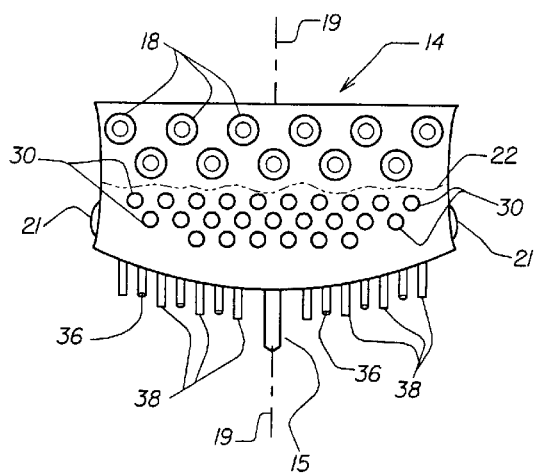
FIG. 2 is a schematic rear view of the ship of FIG. 1 equipped with the propulsion system of FIG. 1.
Figure 3:
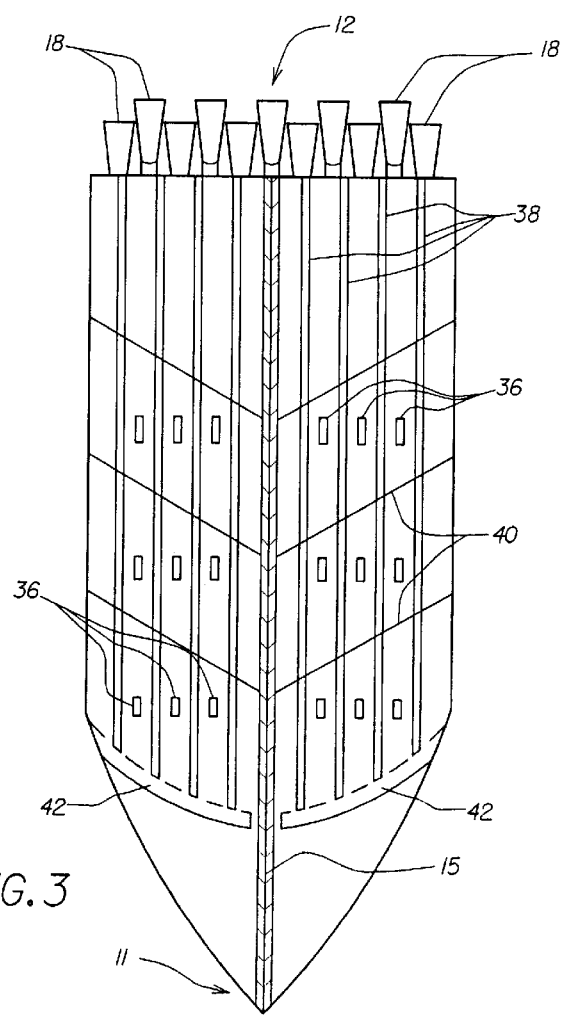
FIG. 3 is a bottom view.

Referring now to FIGS. 1–3, an embodiment of the propulsion system of the present invention is shown in functional association with the hull 10 of a large nuclear-powered ship having a bow portion 11, stern region 12, mid-ship portion 13, top side region 14, and keel area 15. A nuclear reactor 16 and associated steam generating coils 17 are disposed in mid-ship portion 13. Two steam-generating systems may be employed, namely a primary system that powers turbines which energize pumps, produces electricity, etc., and a secondary system of larger capacity for activating steam expansion thrusters, as will hereinafter be shown.

A number of steam expansion thrusters 18 are rearwardly and horizontally directed from stern region 12 adjacent top-side region 14. Said thrusters may number from eight to twenty, and are symmetrically located with respect to a vertical plane of symmetry 19 shown bisecting the hull upon its longitudinal axis. Thrusters 18 are fashioned as expansion nozzles having distal extremities 19 which may have diameters in the range of 5 to 20 feet. The proximal extremity 20 of each thruster receives high pressure steam directly from coils 17 associated with said secondary steam-generating system. The pressure of said steam may range up to several thousand pounds/square inch. When activated as the primary propulsive force, the thrusters produce high speed planing movement of the ship, especially when augmented by other aspects of the propulsive system, as will hereinafter be described. The expression "planing movement" as used herein is intended to denote a mode of ship motion wherein the ship is upraised from its normal or "displacement" waterline 22.

A number of water jet drives 30 are rearwardly and horizontally directed from stern region 12 below thrusters 18, and below waterline 22. Said water jet drives may number between about 15 and 25, and are symmetrically positioned with respect to plane of symmetry 19. Each water jet drive is comprised of a pump 31 driven by a turbine 32 activated by high pressure steam from coils 17. Pumps 31 may also serve additionally to supply water to the boilers of said secondary steam-generating system that feed expansion thrusters 18. A supply conduit 33, having an intake extremity 34, feeds ambient sea water to pump 31. Chemical treatment means such as ion exchange beds or reverse osmosis membranes may be associated with supply conduit 33 to cause the indrawn sea water to be in better condition for feeding to the steam-generating boilers. Screens 27 are disposed upon intake extremities 34 to protect turbine 32 from debris. An adjustably positionable scoop 44 may be associated with the rearward extremity of said screens for the purpose of controlling the volume of water entering intake extremities 34. The effectiveness of pumps 31 may be augmented with the injection of high pressure steam by way of line 35 communicating with coils 17. The water jet drives provide auxiliary propulsive force during the planing mode of ship operation, and may be employed as sole propulsive means during conventional displacement mode of ship operation.

A number of water jet thrusters 36 are directed predominantly vertically downward from the hull bottom adjacent keel area 15. Each jet thruster 36 is comprised of a pump 37 which receives ambient ocean intake water from laterally positioned ports 21, and directs this water downwardly and slightly abaft with considerable force. Other water, such as cooling or processing water from boiler operations may also be fed to said jet thrusters. Said water jet thrusters may range in number from about 20 to 100, and are symmetrically arranged in the hull bottom 24. Their effect is to raise the ship higher in the water to facilitate the planing mode of motion and to match sea conditions to produce optimal ride. The thrust of each jet is integrated in a system for optimizing speed and efficiency.

Air dispersing means, in the form of air pumps 28 and associated air distributor conduits 41 and dispersing means 42 are interactive with said hull bottom adjacent bow portion 11. The function of said air dispensing means is to create a curtain layer of air beneath the hull bottom 24, thereby minimizing the frictional resistance of the ship in the course of its forward motion.

The hull bottom is provided with a configuration which constrains the dispersed air bubbles produced by air pumps 28 to pass in a wiping manner along said hull bottom. In the particular embodiment shown in FIG. 2, a series of longitudinally disposed parallel auxiliary keels 38 is symmetrically positioned within said hull bottom. The function of said auxiliary keels is to constrain air bubbles and route said bubbles along the length of the keel area, thereby minimizing the drag effect upon the hull. The hull bottom is also provided with steps 40 which function in conjunction with said air curtain to further reduce drag, especially in the planing mode of motion.

In view of the aforesaid components and their selective interactions, a large ship is provided with the capability of enhanced speed and versatility of propulsion mode to suit varied tactical assignments and weather conditions.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A propulsion system for a large ship comprising:
    a) a number of steam expansion thrusters rearwardly directed from the stern portion of the ship,
    b) a number of water jet drivers rearwardly directed from the stern portion of the ship, and
    c) a number of water jet thrusters downwardly directed from the hull portion of the ship,
    d) said system being powered by high pressure steam produced by a nuclear reactor.

2. The propulsion system of claim 1 further comprising air dispersing means for creating a curtain of air bubbles in close proximity to said hull, and air constraining means in said hull portion for channelling the passage of said air bubbles in a manner to reduce frictional drag effect upon said hull portion.

3. The propulsion system of claim 1 wherein said steam expansion thrusters are fashioned as expansion nozzles operated by said high pressure steam and have distal extremities located above the normal water line of the ship.

4. The propulsion system of claim 1 wherein each of said jet drivers is comprised of a pump driven by a turbine activated by said high pressure steam and serving to force sea water rearwardly from said stern portion at a location below said water line.

5. The propulsion system of claim 1 wherein said water jet thrusters, in addition to being downwardly directed, are also directed toward the stern portion of the ship.

6. The propulsion system of claim 5 wherein said water jet thrusters are numbered between 20 and 100, and are symmetrically located in said hull portion.

7. The propulsion system of claim 1 wherein said air containing means is a series of longitudinally disposed parallel auxiliary keels symmetrically positioned within said hull portion.

8. The propulsion system of claim 1 wherein said hull portion is further provided with a series of transverse steps which function in conjunction with said curtain of bubbles to reduce the drag effect of the sea water upon said hull portion.

\* \* \* \* \*